Patented Sept. 8, 1953

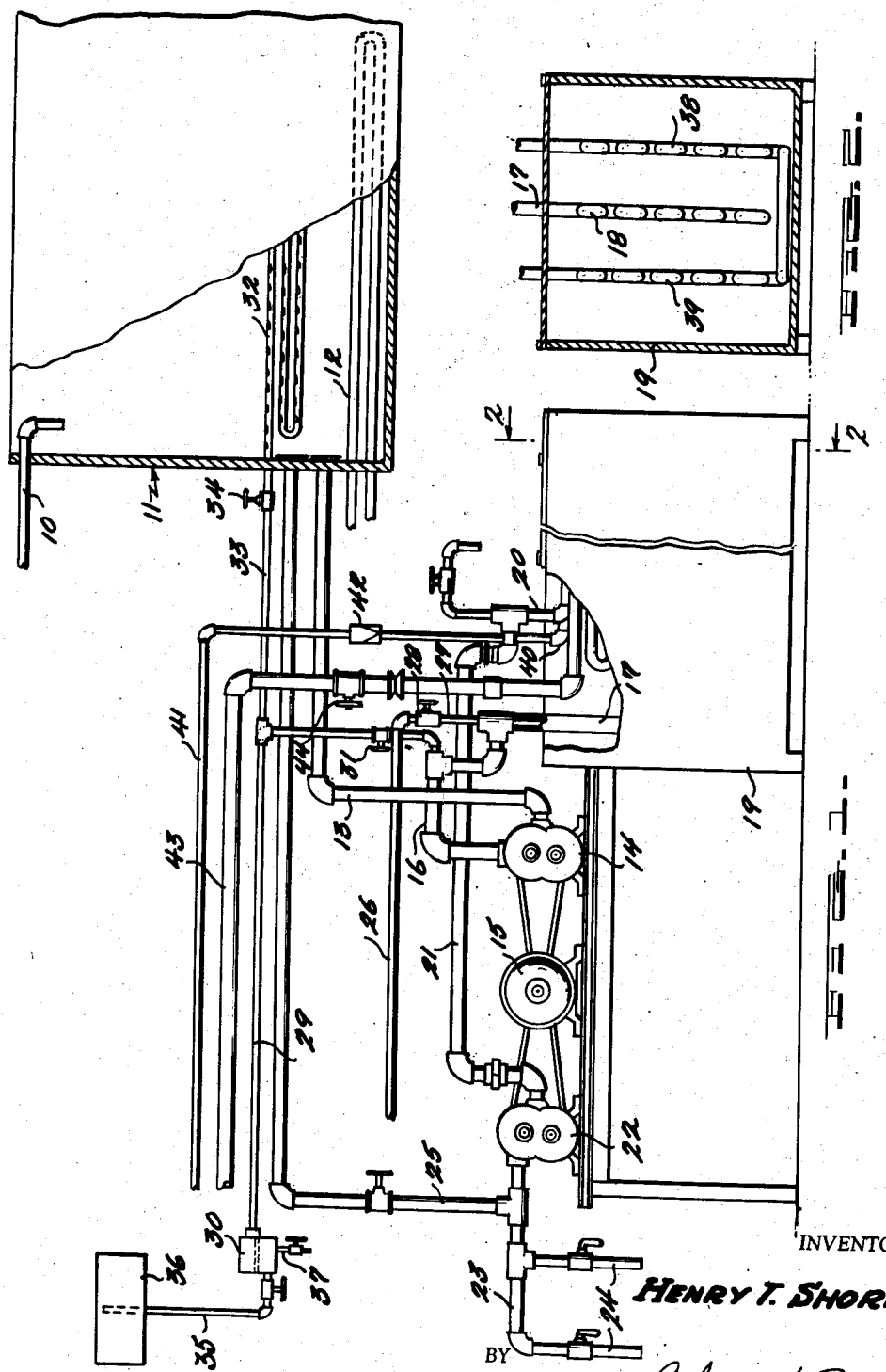

2,651,185

UNITED STATES PATENT OFFICE 2,651,185

APPARATUS FOR PROCESSING LIQUIDS TO CONVERT THEM INTO SEMISOLID OR SOLID FORM

Henry T. Shore, Savannah, Ga.; Harry T. Shore, Jr., executor of said Henry T. Shore, deceased Application November 2, 1949, Serial No. 125,067

4 Claims. (Cl. 62—114)

This invention relates to the treatment of liquid materials and has more particular reference to a method of and apparatus for processing liquids to convert them from liquid form to semi-solid or solid form.

One object of the present invention is to provide a novel method of and improved apparatus for processing liquids to convert them from liquid form to a semi-solid or solid form.

Another object of the present invention is to provide apparatus for processing liquids as set forth above, having provision for cooling and agitating the liquid being treated, then further agitating and pumping the cooled liquid through a refrigerating compartment to convert it into semi-solid or solid form and pumping out and finally agitating the semi-solid or solid material ready for delivery into suitable containers.

Another object of the invention is to provide relatively simple and highly efficient apparatus of the type set forth having novel heat exchanging means for quickly heating the solidified material and preventing it from clogging up the conduits in the refrigerating compartment, thereby permitting the pumps to be operated continuously.

Another object of the invention is to provide apparatus of the type set forth, having a steam contact heat exchanger associated with the chilling coil to melt the semi-solid or solid material therein very rapidly when it is desired to clean out the coil; and a compressed air conduit connected to the chilling coil to blow out the melted material.

A further and more limited object of the invention is to provide a novel method of processing lard to convert it from a liquid state to a semi-solid state.

Other objects and advantages of the invention will appear in the following specification, when considered in connection with the accompanying drawings, wherein:

Fig. 1 is an elevational view, partly in section and with parts broken away, of a form of processing apparatus constructed in accordance with the present invention; and Fig. 2 is a vertical sectional view taken on the line 2—2 of Fig. 1.

In general, the present invention provides a method of and apparatus for processing materials to change them from a liquid state to a semi-solid or solid state by agitation or temperature change, or both, and the working or kneading of the semi-solid or solid product to make it smooth and free of grainy substances. While the apparatus may be employed to process various types of material, such as ice cream, lard, and similar material, the apparatus will be described as employed to process lard from its liquid state to its semi-solid state.

Referring now to the drawing, there is shown, in Figs. 1 and 2, a preferred embodiment of apparatus constituted and arranged in accordance with the invention for processing lard.

In the assemblage of parts, as shown in Fig. 1, the raw product, hot liquid lard in the instant case, is delivered from the rendering kettles (not shown) through a conduit 10 to a holding or storage tank 11.

A coil 12 may be mounted in the bottom of the tank and connected to the city water supply for cooling the liquid lard in the tank to reduce its temperature.

The liquid lard is withdrawn from the holding tank 10 through a pipe line 13 by means of a pump 14, which is preferably of the positive displacement, gear type and adapted to be chain driven at constant speed by a motor 15. The delivery side of the pump 14 is connected by a pipe 16 to the intake pipe connection 17 of a chilling coil 18 mounted in a brine tank 19.

The liquid lard is semi-solidified in the chilling coil 18 and is withdrawn therefrom through outlet pipe connection 20 and pipe line 21 by means of a pump 22, which is preferably of the positive displacement gear type and adapted to be chain driven at constant speed by the motor 15.

The delivery side of the pump 22 is connected to a pipe line 23 having a plurality of spaced valved filler connections or spouts 24. A valved by-pass pipe line 25 connects the delivery pipe line 23 with the holding tank so that, when the valved filler spouts 24 are closed, the discharge from the pump 22 will be delivered into the holding tank, thereby permitting the pump 22 to continue to run at constant speed. In addition, the semi-solid lard introduced into the holding tank through the by-pass connection helps to reduce the temperature of the hot liquid lard therein.

In order to prevent the liquid lard in the chilling coil 18 from solidifying and becoming so hard as to retard or prevent flow therethrough, a heating medium, such as hot water or steam, preferably steam, from a source (not shown), is forced through a pipe 26 connected to a defrosting pipe 27 which is concentrically mounted in and extends through the intake pipe connection 17, the coil 18, and the outlet pipe connection 20. The discharge end of this defrosting pipe may lead to a drain (not shown). The defrosting pipe 27 is provided with a control valve 28 by means of which the flow of steam is controlled, so that the rate of solidification of the liquid lard in the chilling coil 18 may be controlled.

When it is desired to clean out the chilling coil 18, the flow of stream through the coil 18 may be increased, thereby quickly heating the defrosting pipe sufficiently to liquefy all the lard in the coil, which may then be blown out by the use of compressed air which enters the pipe line 16 through a pipe line 29. The pipe line 29 is connected at one end to an air filter 30 and is provided with a control valve 31, by which the admission of air into the pipe line 16 is controlled.

If desired, and as shown in the apparatus illustrated, a perforated pipe coil 32 may be positioned within the holding tank 11 adjacent the bottom thereof and connects by a branch pipe line 33 to the pipe line 29. The branch pipe line 33 being provided with a control valve 34 for controlling the admission of compressed air into the holding tank 11. The compressed air bubbling up through the hot liquid lard in the holding tank, thoroughly agitates the hot lard and helps to reduce its temperature.

The air filter 30 may be of any suitable type and is connected by a valved pipe line 35 to a compressed air supply tank 36 and is shown as having a valved drain connection 37.

The brine in the tank 19 is cooled by means of a spaced pair of connected cooling coils 38, 39, immersed therein and positioned on opposite sides of the coil 18. The coil 38 is connected at its upper end by means of a reducing elbow connection 40 to a pipe line 41 carrying an expansion valve 42, and connected through the usual condenser to the delivery end of any usual type of compressor (not shown). The coil 39 is connected at its upper end to a pipe line 43 carrying a control valve 44. The pipe line 43 is connected to the suction side of the compressor.

The operation of the apparatus in processing lard is as follows:

Hot liquid lard is delivered to the holding tank from the reducing kettles at a temperature above 180° F. In the holding tank the liquid lard is cooled by the air bubbling upwardly therethrough and by the circulation of the cool water through the coil, and its temperature is reduced to about 100° F. to 150° F.

The temperature of the brine in the brine tank is kept at about 18° F. and the rate of flow of the steam through the defrosting line is controlled to permit the chilled semi-solid lard to have a temperature of about 75° F. as it comes from the chilling coil 18 and enters the pump 22.

The two pumps 14 and 22 are of the constant speed gear type and the gears, as they rotate at about 250 revolutions per minute, act as smashing gears and eliminate any grainy substances, making the product smooth.

While the apparatus has been described as used to process lard, obviously, it may be used, without modification, to process various substances, for example, making ice cream. In making ice cream, the air pipe 29 may be used to aerate the cream as well as to blow out the coil 18 and clean out the system.

Obviously, the invention is not restricted to the particular embodiment and arrangement thereof herein shown and described. Moreover, it is not indispensable that all the features of the invention be used conjointly, since they may be employed advantageously in various combinations and sub-combinations.

What is claimed is:

1. Apparatus for processing a liquid to convert it to a semi-solid state, comprising a holding tank for receiving and holding the liquid to be treated; a refrigerating compartment; a chilling coil mounted in said compartment and having an inlet connection and an outlet connection for the continuous passage of such liquid therethrough; means for refrigerating said compartment to convert the liquid to a semi-solid state during its flow through said coil; a positive displacement gear pump having its suction end connected to said holding tank and its discharge end connected to the inlet connection of said chilling coil; a conduit having at least one filling spout connected thereto; a second positive displacement gear pump having its suction end connected to the outlet connection of said chilling coil and its discharge end connected to said conduit; a motor connected to drive said pumps at a constant speed to deliver said liquid from said holding tank into said chilling coil where it is converted into a semi-solid and to deliver the semi-solid formed in the chilling coil to the filling spout and to agitate the liquid and semi-solid as it passes through the respective pumps; and a small defrosting conduit adapted to be connected to a source of heating medium mounted within and extending through said chilling coil for preventing the semi-solid material passing therethrough from freezing and clogging up the chilling coil and for quickly melting the semi-solid material therein whenever the chilling coil is to be cleaned out.

2. Apparatus, as set forth in claim 1, wherein a perforated coiled conduit is mounted in the bottom of said holding tank and connected to a source of compressed air whereby the liquid in the tank can be pre-cooled and agitated by bubbling air up through the liquid.

3. Apparatus, as set forth in claim 1, including a conduit connecting said chilling coil to a source of compressed air for blowing the semi-solid material out of the coil after it has been melted and cleaning out the coil.

4. Apparatus for processing a liquid to convert it to a semi-solid state, comprising a refrigerating compartment; a chilling conduit mounted in said compartment for the continuous passage of the liquid being treated therethrough; means for refrigerating said compartment to convert the liquid to a semi-solid state during its flow through said chilling conduit; pumping means for forcing the liquid being treated into and through said chilling conduit; a small defrosting conduit adapted to be connected to a source of heating medium mounted within and extending through said chilling coil for preventing the semi-solid material passing therethrough from freezing and clogging up the chilling conduit and for quickly melting the semi-solid material in the chilling conduit whenever it is to be cleaned out.

HENRY T. SHORE.

References Cited in the file of this patent

UNITED STATES PATENTS

| Number | Name | Date |
| --- | --- | --- |
| 772,656 | Gerner | Oct. 18, 1904 |
| 1,645,742 | Fee, Jr. et al. | Oct. 18, 1927 |
| 1,944,056 | Baer | June 16, 1934 |
| 2,054,835 | Routh | Sept. 22, 1936 |
| 2,132,364 | Thompson | Oct. 4, 1938 |
| 2,197,457 | Werk et al. | Apr. 16, 1940 |
| 2,304,579 | Lindsey | Dec. 8, 1942 |
| 2,344,215 | Soling et al. | Mar. 14, 1944 |
| 2,426,368 | Mayne et al. | Aug. 26, 1947 |
| 2,466,896 | Horneman et al. | Apr. 12, 1949 |
| 2,495,625 | Bodinus | Jan. 24, 1950 |